UNITED STATES PATENT OFFICE.

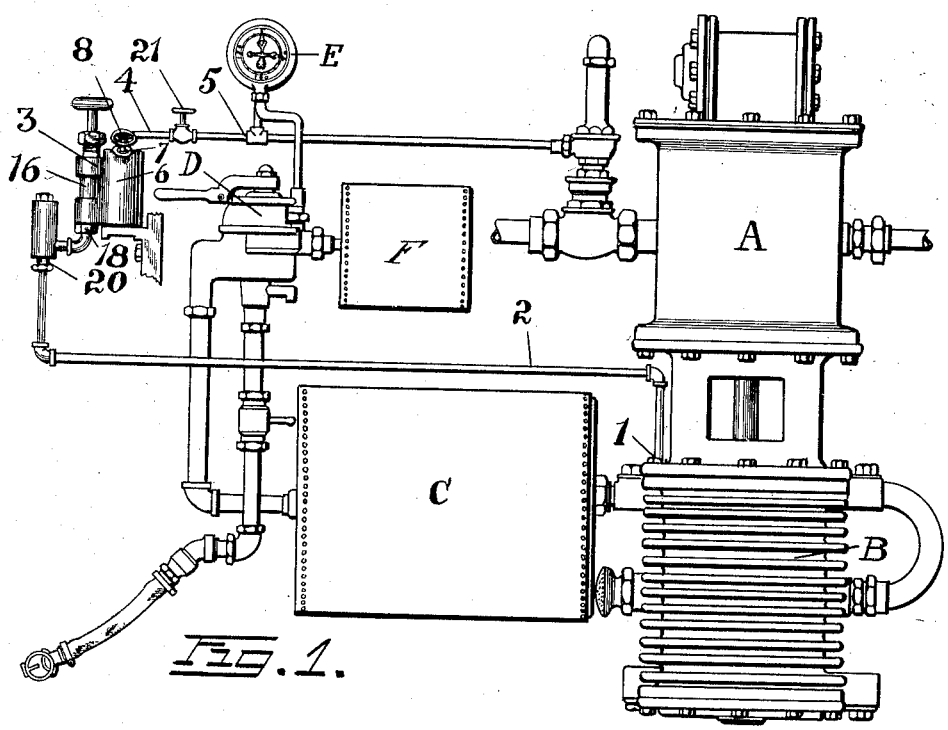
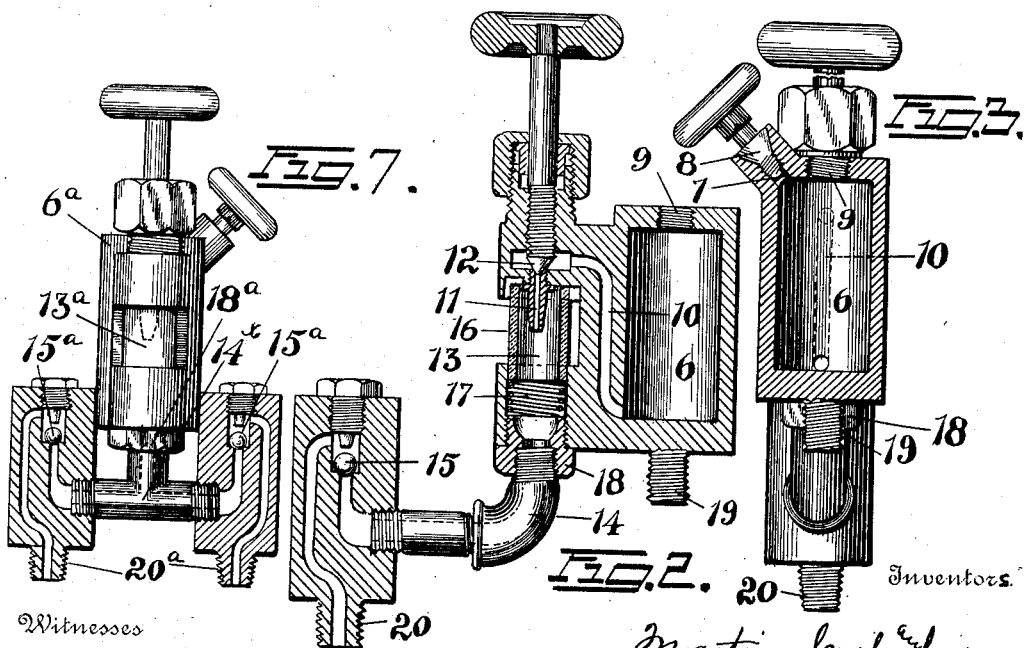

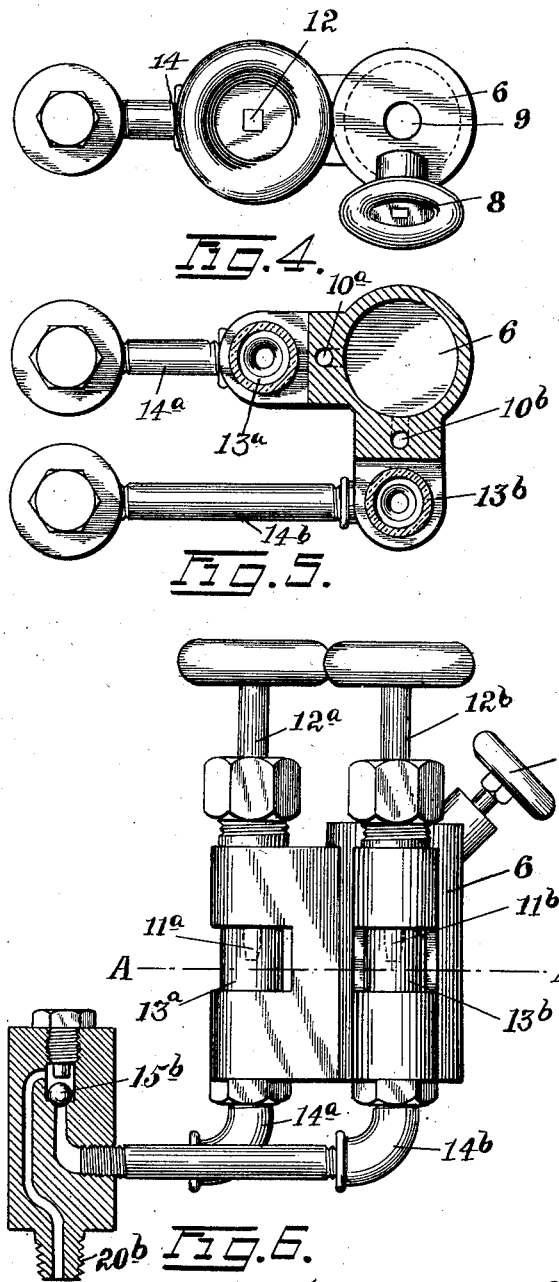

MARTIN CARLE AND WILLIAM E. KRAFT, OF CLIFTON FORGE, VIRGINIA.

LUBRICATOR FOR AIR-PUMPS.

1,004,989. Specification of Letters Patent. Patented Oct. 3, 1911.

Application filed September 22, 1909. Serial No. 519,076.

*To all whom it may concern:*

Be it known that we, MARTIN CARLE and WILLIAM E. KRAFT, citizens of the United States, both residing at Clifton Forge, Alleghany county, and State of Virginia, have invented certain new and useful Improvements in Lubricators for Air-Pumps, of which the following is a specification.

Our invention relates to lubricating means for the air compressor in compressed air system, and particularly to that class of such systems, for instance, air brake systems, where it is very important to provide the compressor with means whereby the lubricant of considerable consistency may be conveniently delivered at will, in accurately measured quantities and without flooding, in case the lubricating valve is left open while the apparatus is at rest.

In delivering lubricant of the kind specified, to machinery of the class referred to, it is necessary that the pressure of the apparatus be used to force the lubricant from the reservoir in the small proportions needed and at the same time to cause the suction of the apparatus to introduce the lubricant in finely divided form with the ingoing charge of air as a vehicle. But it is important, in forcing the feed of heavy lubricant from the lubricant reservoir, to avoid connecting up the air compressor in a manner to cause pulsation in the feed of the oil, which prevents accurately judging the feed by sight; and it is also important to avoid introducing grit and foreign matter from the air of the compressor; also to prevent flooding the mechanism to be lubricated as a result of the suction and pressure acting on the lubricant. It is also important to avoid flooding of the lubricated mechanism as a result of carelessness in leaving open the needle valve leading from the lubricant reservoir.

Our invention accomplishes all the desired results in a very simple and effective manner, and it consists in combining with the air brake system, a reservoir for heavy lubricant, having a pressure connection with a high point in the system supplying clean air under constant pressure, providing said lubricator with a sight feed in or near which is a relief for the pressure above the lubricant, as well as an inlet for air in response to the suction stroke of the compressor; an overflow relief also adjacent to said sight feed so that surplus of lubricant will not gravitate into the compressor and a trapped passage from the sight feed to the compressor cylinder through which the intentional delivered lubricant may be drawn by air on the suction stroke, but through which it will not gravitate.

In the accompanying drawings, Figure 1 illustrates a known arrangement of air brake pump, main reservoir, pressure gage, and pump controlling valve, to which our invention is applied by way of illustration; Fig. 2 is a vertical section through the lubricator detached; Fig. 3 is a vertical section through the lubricator in a plane at right angles to the plane of Fig. 2, Fig. 4 is a top plan view of the form of lubricator shown in Figs. 1, 2 and 3; Figs. 5 and 6 are, respectively, a section on the line A—A of Fig. 6, and a side elevation partly in section, showing a modified construction of the lubricator adapting the invention for application to compound pumps, whereby oil may be fed from a single reservoir through independent regulating means. Fig. 7 is a view of a further modification of the lubricator used in connection with compound pumps wherein a single reservoir is connected to the different compression chambers through independent feeding and checking passages.

A represents the steam cylinder and B the air cylinder of the pump of an air brake system.

C is the main reservoir; D is the engineer's valve and E is the pressure gage.

F represents the usual equalizing drum which has no bearing upon the present invention.

It is common to have a lubricator of some kind connected with the head of the cylinder B at some point, such as 1. According to our invention, we connect a pipe 2 at some suitable point such as 1. This pipe communicates with the lubricator 3, the construction and application of which constitutes the subject matter of our invention. This lubricator is preferably located near the pressure gage E, first because it is thus brought within convenient reach of the engineer without leaving the cab, and secondly because it is thus housed within the cab where the lubricant is kept at a more workable temperature. The lubricator 3 is connected through a pipe 4 with a point in the system adapted to supply clean, dry air at a non-pulsating pressure, as for instance, with the gage pipe 5, which is beyond the main reservoir C, so that a pressure of air may be introduced at will above the lubricant in the reservoir of the lubricator and when so introduced, will expel the lubricant upward through the discharge passage, causing a steady flow to be delivered in uniform drops, at the will of the engineer, as will be explained.

Referring to Figs. 2 and 3, it will be seen that the lubricator comprises a reservoir 6 having a filling opening 7 adapted to be closed by the valve 8 and having the opening 9 for connection with the pipe 4 already referred to. The reservoir has an upwardly extending outlet 10 which terminates in a drip nozzle 11 adapted to be controlled by a taper valve 12 which discharges into a suction chamber 13, which communicates through a pipe 14 with the cylinder to be lubricated; a gravitating check valve 15 being interposed for the purpose of checking back pressure during the compression stroke.

The suction chamber 13 is preferably in the form of a sight tube 16, through which the amount of oil being supplied by the valve may be observed and which sight tube is so fitted between its seats as to vent the pressure behind the oil so that it has no influence in forwarding the oil beyond the drip nozzle 11 and also to admit air in response to each suction stroke of the compressor, sufficient to bear the oil into the cylinder to be lubricated. In the preferred construction, the sight tube 16 fits loosely between its seats and is held normally elevated by a spring 17, the sight tube and spring being introduced from beneath through the bore closed by the plug 18, which also affords connection with the pipe 14.

19 represents a threaded shank by which the lubricator may be supported in position.

20 represents the nipple by which the lubricator is connected with the pipe 2.

21 is a cut-off valve in the pipe 4.

According to the modification shown in Figs. 5 and 6, oil from the reservoir 6 is fed through the outlets $10^a$ and $10^b$ and delivered through nozzles $11^a$ and $11^b$, controlled by the valves $12^a$ and $12^b$, to the suction chambers $13^a$ and $13^b$ whence it passes through the passages $14^a$ and $14^b$ to the check valves $15^a$ and $15^b$ through which it is delivered to the respective pressure chambers of the compound pump.

According to the modification shown in Fig. 7, the suction chamber $13^a$ supplies a feed pipe $14^x$ which has two discharge ends, each of which receives the housing of a check valve $15^a$ that terminates in a nipple $20^a$ adapted to be connected to different pumping cylinders.

The operation of the device is as follows: Instead of having a constant feed supplying an excess of oil, the lubricator is opened and the feed is permitted to take place only when the judgment of the engineer dictates. To feed the oil, the valve 21 is opened to introduce pressure above the body of oil in reservoir 6 and then the valve 12 is unscrewed gently until the proper amount of drip is observed in the sight feed 13, which will be uniform and readily estimated because of the constant pressure back of the oil and the venting of the sight feed, which prevents the measuring of the oil from being influenced by the intermittent suction of the cylinder. When this is accomplished, each suction stroke of the engine will draw air in around the glass or tube 16 and the oil dripping into the passage 14 will become finely divided and thoroughly mingled with the air so as to be drawn into the cylinder upon the air as a vehicle. At each compression stroke and before the compression stroke begins, valve 15 seats by gravity and prevents any back pressure to the lubricator. In the event that the drip nozzle should be left open, oil will not gravitate into the compressor cylinder but will escape through the vent around the sight glass.

The importance of our invention will be appreciated when it is remembered that an over feed of oil to the compressor of an air brake system results in gumming up the valves and passages, and renders the engineer's valve, as well as other parts sluggish and difficult to operate. It is not unusual to remove these parts, in consequence of over feeding of oil, and to boil them in caustic for the purpose of freeing the passages from the accumulation.

While the foregoing sets forth a preferred construction of our device, we desire it understood that we do not limit ourselves to the particular details disclosed, but may modify them without departing from the spirit of the invention.

Having thus described our invention, what we claim as new therein and desire to secure by Letters Patent is:—

In combination with an air brake system, having an air compressor and a main reservoir, a lubricating system comprising a reservoir for lubricant having controlled communication with the air system on the discharge side of the main reservoir and thereby adapted to receive clean dry air pressure, a controllable drip nozzle through which said lubricant reservoir discharges, a sight feed tube into which lubricant is discharged, vented to prevent development of air pressure therein and also to admit air in response to suction therein and a trapped lubricant passage leading from the vented sight feed tube to the suction side of the air compressor substantially as and for the purposes set forth.

The foregoing specification signed at Clifton Forge, Va. this 17th day of August, 1909.

MARTIN CARLE.
WILLIAM E. KRAFT.

In presence of—
S. L. MONTGOMERY,
O. S. KITTINGER.

Copies of this patent may be obtained for five cents each, by addressing the "Commissioner of Patents, Washington, D. C."